United States Patent
Vicard (10) Patent No.: US 7,296,050 B2
(45) Date of Patent: Nov. 13, 2007

(54) DISTRIBUTED COMPUTING SYSTEM AND METHOD

(75) Inventor: Dominique Vicard, Bernin (FR)

(73) Assignee: Hewlett-Packard Development Company L.P., Palo Alto, CA (US)

( * ) Notice: Subject to any disclaimer, the term of this patent is extended or adjusted under 35 U.S.C. 154(b) by 784 days.

(21) Appl. No.: 10/347,115

(22) Filed: Jan. 17, 2003

(65) Prior Publication Data

US 2004/0025071 A1 Feb. 5, 2004

(30) Foreign Application Priority Data

Jan. 18, 2002 (EP) .................... 02354007

(51) Int. Cl.
*G06F 15/16* (2006.01)

(52) U.S. Cl. ............... 709/201; 709/203; 709/224; 709/226; 718/105

(58) Field of Classification Search ........... 709/201, 709/208, 218, 203, 224, 226; 718/105
See application file for complete search history.

(56) References Cited

U.S. PATENT DOCUMENTS

| | | | |
|---|---|---|---|
| 5,748,972 A | 5/1998 | Clark et al. | 713/323 |
| 5,978,922 A | 11/1999 | Arai et al. | 713/323 |
| 6,366,951 B1* | 4/2002 | Schmidt | 709/208 |
| 6,397,252 B1* | 5/2002 | Sadiq | 709/226 |
| 6,463,457 B1* | 10/2002 | Armentrout et al. | 709/201 |
| 6,941,480 B1 | 9/2005 | Dai | 713/320 |
| 6,957,353 B2* | 10/2005 | Bresniker et al. | 713/320 |
| 2001/0005894 A1 | 6/2001 | Fukui | 713/310 |
| 2002/0007463 A1 | 1/2002 | Fung | 713/320 |
| 2003/0120778 A1* | 6/2003 | Chaboud et al. | 709/225 |
| 2007/0028237 A1* | 2/2007 | Bulson et al. | 718/1 |

FOREIGN PATENT DOCUMENTS

EP 0 936 532 A2 8/1999

* cited by examiner

*Primary Examiner*—Ario Etienne
*Assistant Examiner*—Ramy M Osman
(74) *Attorney, Agent, or Firm*—Ladas & Parry LLP (57) ABSTRACT

The present invention relates to a distributed computing system and method. Conventional distributed computing environments require complex arrangements to distribute tasks and to collate the results of any distributed processing. There has been a recent trend towards using the spare computing capacity of computers connected to the Internet to provide distributed computing resources. However, various security issues have been identified in relation to such an arrangement. Suitably, the present invention uses a power management system in which a user or system context, which is created and saved when an associated computing system enters a power management state, to provide a distributed computing platform. Once a computer system has entered a power saving state and the user system context has been saved to an HDD, the computer system is arranged to wake-up and to establish, or use, a pre-prepared distributed computing task system context. The power management system is instructed to load and restore the distributed computing task system context, rather than the conventional user system context. In this manner a distributed computing platform using the computer systems that are connected to an Intranet can be used for performing distributed computing. Since the user system context and the distributed computing task system context are not resident within the computer system concurrently, the security issues are at least partially alleviated.

17 Claims, 7 Drawing Sheets

DISTRIBUTED COMPUTING SYSTEM AND METHOD

FIELD OF THE INVENTION

The present invention relates to a distributed computing system and method.

BACKGROUND OF THE INVENTION

Conventionally, distributed computing environments often require very complex management schemes for distributing the tasks that constitute the complete job to be performed. The complex management system is responsible for collating the processing results. Such a distributed computing environment requires a linked, dedicated cluster, of computers for performing such processing. The provision of such a purpose built cluster of computers is a relatively expensive undertaking and is typically avoided unless absolutely necessary.

It has been discovered that most computing resources within a company lie dormant for the majority of the time. Alternatively, those computing resources often have spare processing capacity; that is, the percentage utilisation of the processor within those computing resources is relatively low. Schemes have been developed in which those dormant computing resources are utilised by third party applications. For example, the SETI organisation makes software available to a participating user that will access data from a SETI server, process that data as part of a concurrent task on the user's client machine and return the processing results to the SETI server.

However, even within an Intranet, where the employees of a company are all working towards the same general goals, the use of users' machines to perform distributed computing tasks causes concern. Many relatively senior personnel will be privy to very sensitive commercial information. Also, personnel staff will have access to personal data relating to the employees. In such circumstances, the users are very reluctant to allow their computers to be used for Intranet distributed computing.

A solution that addresses these security of privacy issues is a technology that partitions the disk drives of the users' machines. This partitioning allows separate users to operate using the same physical HDD without the risk of another user being above to see or interfere with the data and applications contained within any other partitions on that machine. However, this solution requires significant modifications to be made to the operating system. Any such modifications are clearly undesirable, especially for application developers, rather the system developers, who may have sufficient technical knowledge to effect such modifications.

It is an object of the present invention at least to mitigate some of the problems of the prior art.

SUMMARY OF INVENTION

Accordingly, a first aspect of the present invention provides a distributed computing method for a computer system having a current system context and comprising a power management system for saving and restoring the system context and for placing the computer system in at least a first power saving state of a plurality of power management states, and an access controller for providing access to a non-volatile storage resource for storing and retrieving the system context; the method comprising the steps of outputting data representing a first system context of the computer system for storage on the non-volatile storage resource;

receiving data representing a second system context for the computer system; the second system context being different to the first system context;

establishing the second system context within the computer system; and processing data using the second system context.

By exploiting the power saving features of ACPI compliant machines, distributed computing can be implemented in a cost-effective manner. Furthermore, since a complete system context is used to implement a distributed computing task, that is, there does not exist a concurrent system context, the security issues described above are alleviated.

Preferably, embodiments provide a method in which the step of outputting data representing the first system context further comprises the step of entering the first power saving state. Suitably, a still further advantage is that, due to the time of the execution of the distributed computing task, the user of a client machine does not experience any degradation in performance. This results from the fact that the distributed computing environment, that is, the user's machine, is only made available or used when that machine has entered a power saving mode, i.e., when the user is not using their machine.

Having saved the previous or current user context, the client machine may be used for distributed processing. Suitably, embodiments provide a method in which the step of processing data comprises the step of processing the data using an application associated with the second system context.

In the interests of security and privacy preferred embodiments provide a method further comprising the step of forming at least first and second partitions on the non-volatile storage resource such that the first partition is arranged to store the first system context and the second partition is arranged to store the second system context. Advantageously, the risk of data used within the user context also being used within the distributed computing system context is reduced as compared to use of the same disk space by both the user and distributed system contexts.

Preferred embodiments provide a method further comprising the step of storing the second system context on the non-volatile storage resource. Preferably, embodiments provide a method in which the step of storing the second system context comprises or is followed by the step of restoring the first system context.

A client machine or system may enter or leave a power saving mode of operation for a variety of reasons. Accordingly, embodiments provide a method further comprising the step of adopting a power management state other than the first power saving state in response to a user input.

Preferred embodiments provide a method in which at lease one of the steps of storing and restoring are performed in accordance with a predetermined schedule.

Preferably, embodiments provide a method in which at least one of the steps of storing and restoring are performed in response to a step of receiving an event. Within preferred embodiments, the step of receiving an event comprises receiving a notification to switch between the first and second system contexts. Preferably, embodiments are provided in which the step of receiving the notification comprises receiving data for identifying and providing access to the second system context.

Preferably, embodiments provide a method further comprising the step of requesting the second system context from a remote server via a network. In this embodiment, once the client machine has been awoken, the data identifying the distributed computing task system context may be retrieved from locally or remotely accessible storage or directly from the server.

The distributed computing system contexts may be prepared in advance either locally or remotely. Suitably, embodiments provide a method further comprising the step of generating data representing the second system context for at lest part of a distributed computing task. The second system context may represent at least a part and, in some instances, the whole of a distributed computing job, that is, a task may form part of a larger job.

Having established the distributed computing system context, embodiments provide a method in which the step of establishing the second system context comprises the step of performing the distributed computing task.

Preferred embodiments are arranged such that the step establishing the second system context is performed during one of the plurality of power saving states.

In preferred embodiments, the various user and distributed computing task system contexts are not resident concurrently, that is, the user system context and the distributed computing system context are not resident within RAM concurrently. This provides greater security and privacy.

Preferably, a second aspect of the present invention provides a computer system, for a distributed computing system, capable of having a current system context and comprising a power management system for saving and restoring the system context and for placing the computer system in at least a first power saving state of a plurality of power management states, and an access controller for providing access to a non-volatile storage resource for storing and retrieving the current system context; the computer system comprising
 means for outputting data representing a first system context of the computer system for storage on the non-volatile storage resource;
 means for receiving data representing a second system context for the computer system; the second system context being different to the first system context;
 means for establishing the second system context within the computer system; and
 means for processing data using the second system context.

Preferably, an embodiment provides a system in which the means for outputting data representing the first system context further comprises means for entering the first power saving state.

Embodiments provide a system in which the means for processing data comprises means for processing the data using an application associated with the second system context.

Preferably, embodiments provide a system further comprising means for storing the second system context on the non-volatile storage resource.

Embodiments provide a system in which the means for storing the second system context comprises means for restoring the first system context. Embodiments are provided in which the means for restoring is invoked after the means for storing.

Embodiments preferably provide a system further comprising means for adopting a power management state other than the first power saving state in response to a user input.

Preferably, there is provided a system in which at least one of the means for storing and means for restoring are invoked in accordance with a predetermined schedule.

Alternatively, or additionally, embodiments provide a system in which at least one of the means for storing and means for restoring are invoked in response to receiving an event. In preferred embodiments receiving an event comprises receiving a notification to switch between the first and second system contexts. Receiving the notification comprises receiving data for identifying and providing access to the second system context in preferred embodiments.

Rather than the distributed computing system context being stored in advance, embodiments are provided in which the system further comprises means for requesting the second system context from a remote server via a network.

To reduce user inconvenience, preferred embodiments can be realised in which the system comprises means for establishing the second system context is performed during one of the plurality of power saving states. Furthermore, preferred embodiments provide a system further comprising means for outputting a message for transmission to a remote server that the first power saving state has been entered.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

Figure 1:
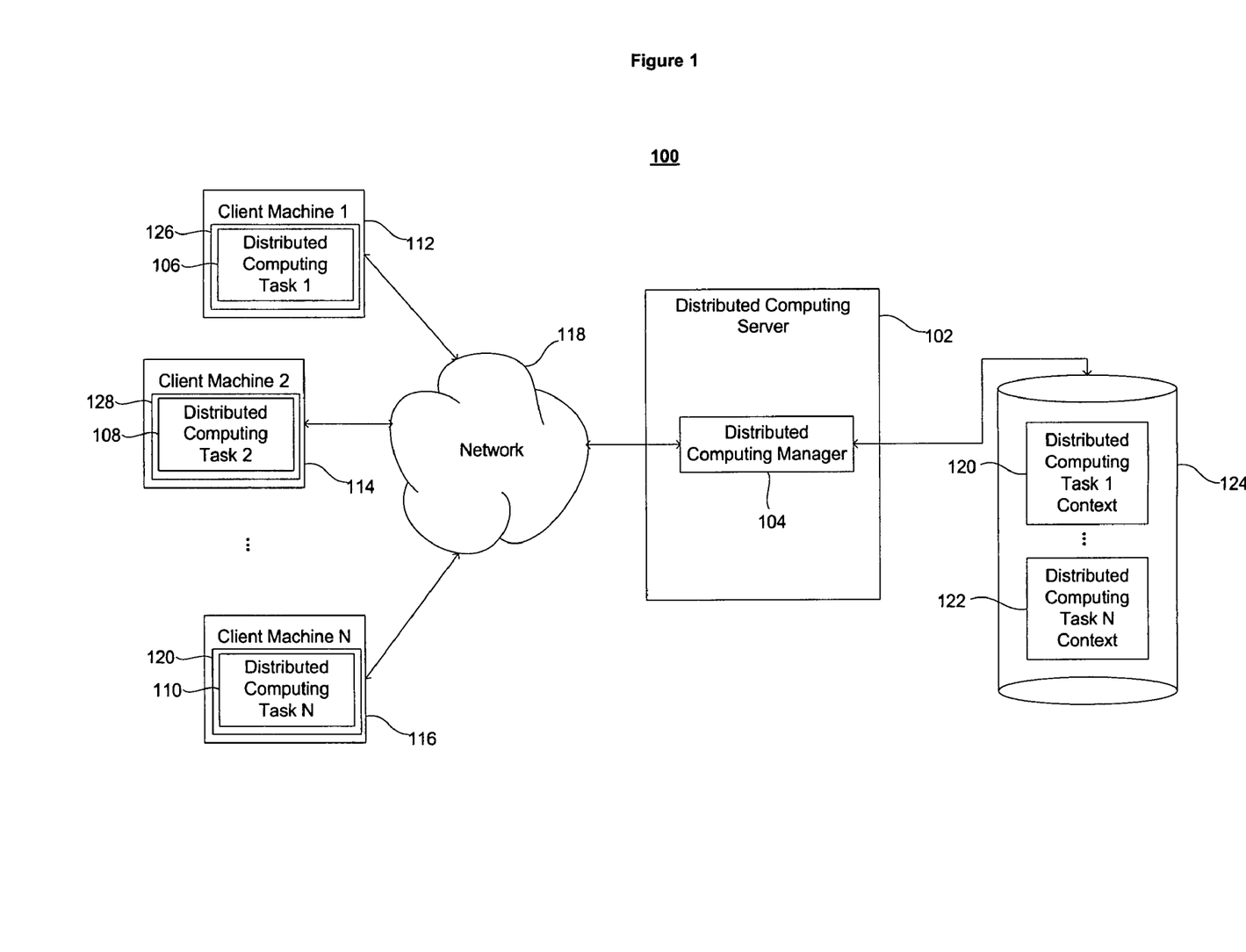
FIG. 1 illustrates a distributed computing environment according to an embodiment of the present invention.

FIG. 1 shows a distributed computing environment 100. The distributed computing environment 100 comprises a distributed computing server 102, which runs a distributed computing manager application 104. The distributed computing manager application 104 is arranged to distribute distributed computing tasks 106, 108 and 110. The distributed computing tasks 106 to 110 are intended to be executed on respective client machines 112, 114 and 116. The tasks 106 to 110 are distributed to the client machines 112 to 116 via a network 118. The distributed computing server 102 creates a corresponding system context 120 to 122 for each of the distributed computing tasks. The corresponding system contexts 120 to 122 are stored on an HDD 124 accessible by the distributed computing server 102.

The distributed computing server 102 distributes to the client machines 112 to 116 the corresponding distributed computing task system contexts 120 to 122. The client machines 112 to 116 receive their corresponding distributed computing task system contexts and use them to create respective client machine system contexts 126, 128 and 130 that are arranged to implement the distributed computing tasks 106 to 110.

The server 102 can be realised using either a single physical instance or a functional instance. A functional instance is realised using several machines that are arranged to cooperate and that appear to operate as a single physical instance.

It will be appreciated that preferred embodiments use an Intranet of a company to implement the distributed computing environment 100. Due to the above mentioned security concerns, preferred embodiments are arranged to ensure that the client machines 112 to 116 are only used for distributed computing when the users (not shown) of those machines are not using those machines.

Preferably, the distributed computing tasks are performed while the client machines 112 to 116 are in a power saving state in which computing tasks can still be initiated and executed but in which not all of the devices associated with the client machines 112 to 116 are in a fully powered state.

It will be appreciated by those skilled in the art that the user context of a client machine will be saved prior to the client machine being placed in a power saving state. The user context corresponds to the system context of a client machine as established by a user. User contexts are used to allow the client machines 112 to 116 to be placed in a power saving state. Upon detection of a wake-up event, a wake-up process is instigated in which the user context of a client machine is restored and the client machine is arranged to adopt another power consumption state. The other state is usually a working state, which is a state having the highest power consumption.

Within embodiments of the present invention, the client machine is arranged, upon wake-up, to load and establish the distributed computing task system context rather than the user context. In effect, the user system context is switched for the distributed computing task system context to allow the distributed computing task to be executed during a period of time when the client machine would be otherwise idle.

The wake-up process is instigated by the distributed computing server 102 sending a wake-up notification message via the network 118 to those client machines that have corresponding distributed computing tasks to perform. Once a client machine 112 to 116 has been awoken, the distributed computing server 102 can then forward to an appropriate client machine a corresponding distributed computing task system context 120 to 122.

Alternatively, the distributed computing task system contexts 120 to 122 may be distributed to the client machines 112 to 116 and stored on local storage (not shown) of each client machine prior to the client machines 112 to 116 being restored to a power consumption state in which the distributed computing task can be performed.

For example, throughout the day when user contexts are established and the client machines 112 to 116 are being used, the distributed computing server 102 may commence transmission of the distributed computing task system contexts to the client machines 112 to 116 in such a way that the distributed computing task system contexts are received and stored locally at the client machines 112 to 116 and that does not, form the users' perspective, adversely affect the performance of the client machines to any significant degree.

Preferably, the client machines 112 to 116 are awoken from their power saving state before the distributed computing task system contexts 120 to 122 are distributed.

Figure 2:
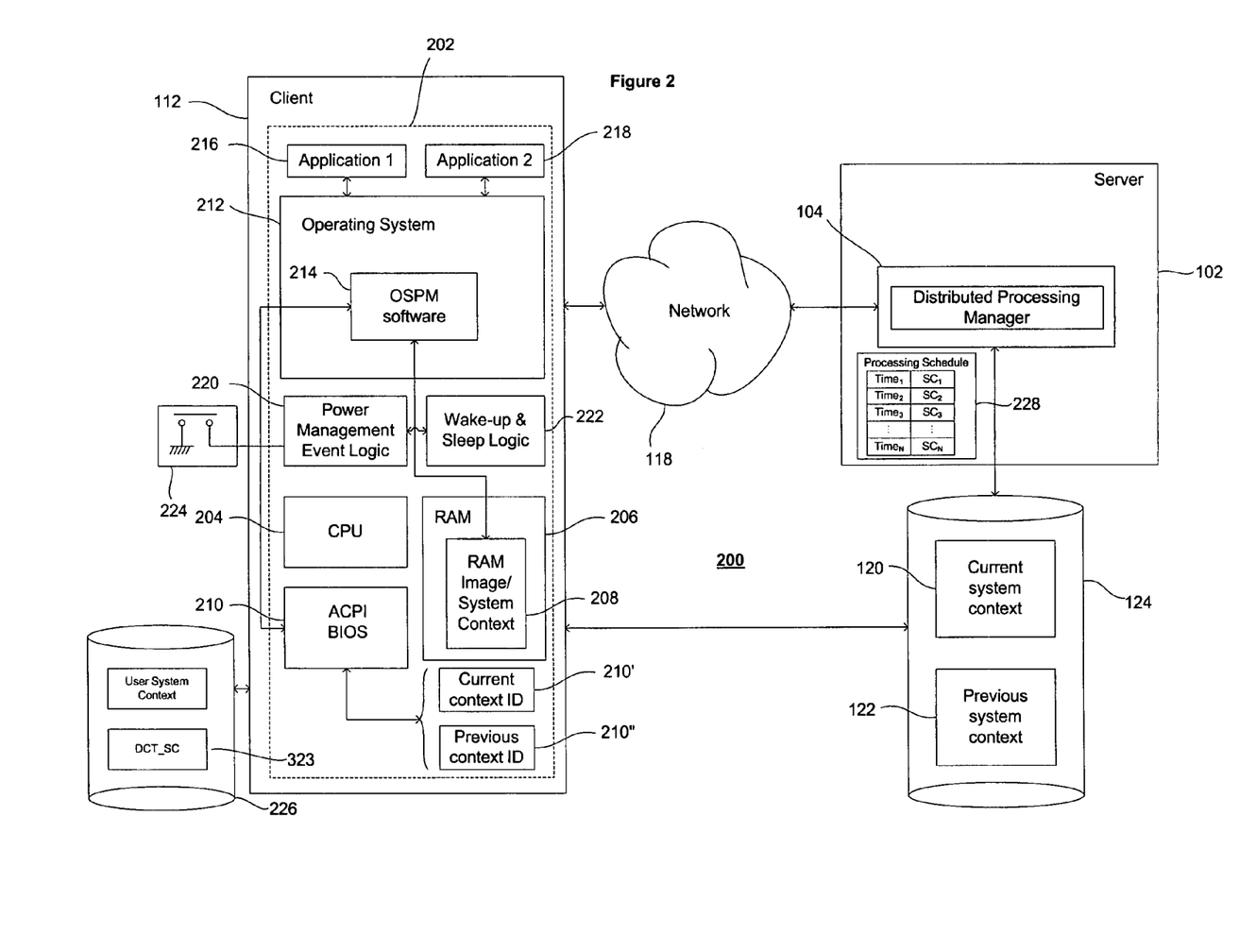
FIG. 2 shows schematically a client machine for implementing an embodiment of the present invention.

FIG. 2 illustrates schematically a computer system 200 within which ACPI specification power management is realised. The computer system 200 comprises at least one of the client machines, that is, client machine 112, which is capable of having a system context 202. The client machine 112 comprises a processor 204, RAM 206 containing a RAM image 208. The client machine 112 also comprises ACPI routines, which are preferably implemented using an ACPI BIOS 210. The client machine 112 has an operating system 212, which is arranged to implement operating system directed power management (OSPM) using OSPM software 214. The client machine 112 will run various applications 216 and 218. Additional hardware and software functionality is provided in the form of power management event detection logic 220, which detects events in response to which the current power state of the client machine 112 can be changed to another state. For example, the user may depress an ON button 224, in which case the client machine 112 can effect a transition from a current sleeping state to a working state S0. Alternatively, the user may instigate a software shutdown of the client machine 112 in response to which the client machine 112 can effect a transition from the current state to a sleeping state. The events that the power management event detection logic 220 may detect also include other events. The other events include, for example, modem generated events that signal to the OSPM software 214 that data is being received and that at least the modem (now shown) and RAM should be suitably powered-up to allow reception of the data.

The server 102 preferably contains a processing schedule 228 that is used to control the timing of the distribution of the distributed computing tasks. The schedule 228 contains a preferred start time. $Time_1$ to $Time_N$ for corresponding distributed computing task system contexts $SC_1$ to $SC_N$. The corresponding distributed computing task system context $SC_1$ to $SC_N$ are stored on the local HDD 124 of the server.

Figure 3:
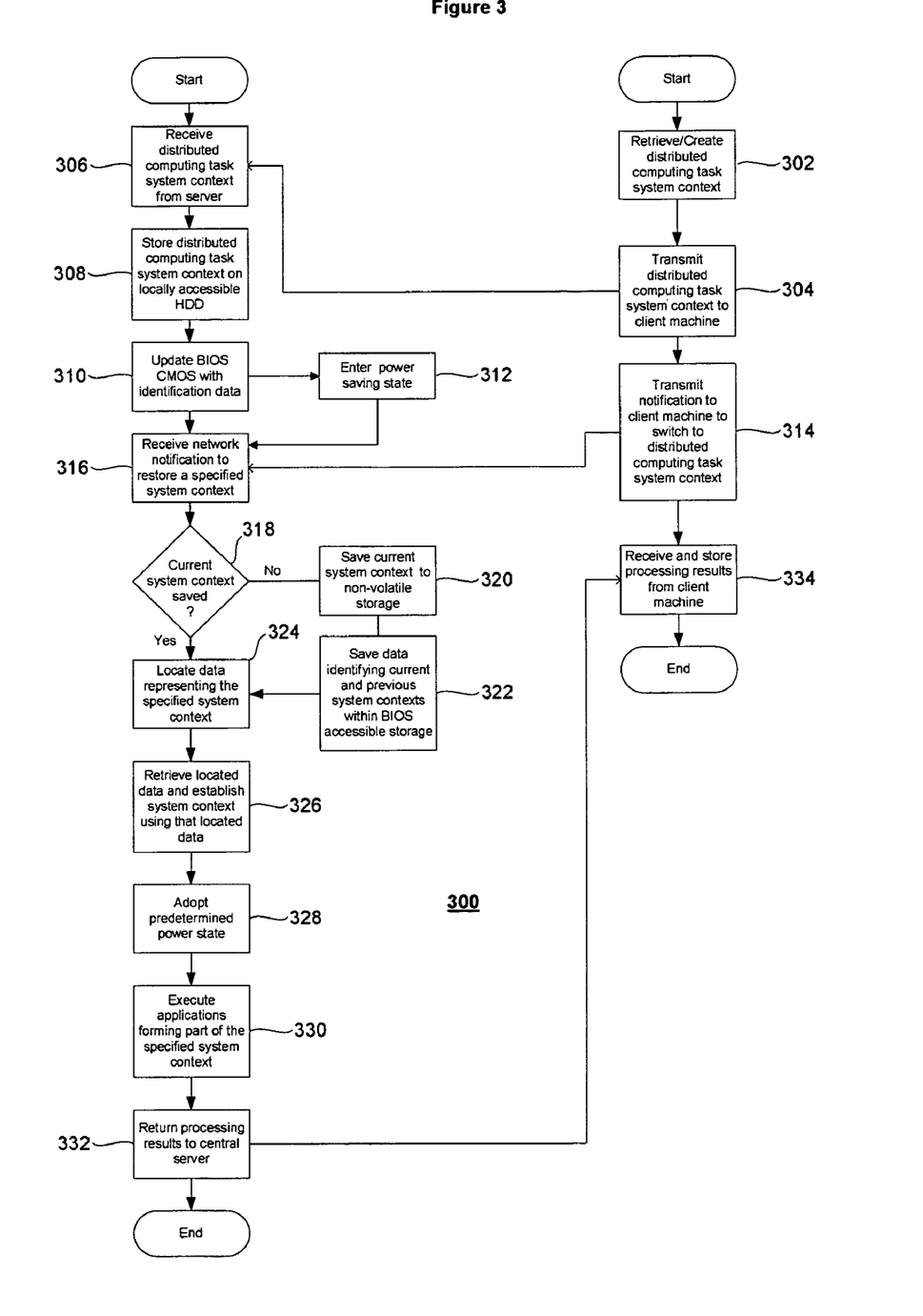
FIG. 3 depicts flowcharts of the processing undertaken by a client machine and a server according to an embodiment.

Referring to FIG. 3, there is shown a schematic flow chart 300 of the processing steps performed by the distributed computing environment 100 according to an embodiment. The flow chart 300 describes an embodiment in which a distributed computing task system context 106 is stored, in advance, on a local HDD 226 of a client machine intended to execute a distributed computing task.

The distributed computing server 102, at step 302, creates the distributed computing task system context or retrieves that context from the local HDD 124. The distributed computing task system context is transmitted, at step 304, to the client machine where it is received at step 306. The client machine at step 308, stores the data representing the recently received distributed computing task system context on the locally accessible HDD 226. Identification data associated with the distributed computing task system context and user system context are stored within the BIOS in storage areas 210' or 210" at step 310.

An optional step 312 provided in which the client machine enters a power saving state of operation after the distributed computing server 102 has transmitted the distributed computing task system context 106 to the client machine. Preferably, the server 102 awaits confirmation of its safe receipt and storage.

The distributed computing server 102 transmits a notification at step 314 to the client machine. The notification contains data instructing the client machine to switch from a current user system context to the distributed computing task system context 106. The notification is received by the client machine at step 316.

A determination is made, at step 318, as to whether the current system context (user context) of the client machine has been saved. If the determination is negative, the current system context is saved to he non-volatile storage at step 320. The non-volatile storage may be the HDD 226 of the client machine or an HDD that is accessible via the network 118. Having saved the current system context to non-volatile storage, the current context ID and previous context ID data 210' and 210" are updated accordingly at step 322. Control then transfers to step 324. If the determination at step 318 is positive, the data 323 representing the distributed computing task system context is located at step 324. The data 323 is retrieved and used to establish a system context for the distributed computing task at step 326. Step 328, which is optional, arranges for the client machine to adopt a pre-determined power consumption state. The power consumption state may be, for example, a state in which the minimum resources needed to perform the distributed computing task are powered while all other system resources of the client machine are either unpowered or operating in a power saving mode.

At step 330, effect is given to the distributed computing task by executing an application that forms a part of the distributed computing task to process any associated data (not shown). The results of the execution of the distributed computing task are returned at step 332 to the distributed computing server 102. The distributed computing server 102 receives and stores the processing results transmitted by the client machine at step 334. The associated data may be sent to the client machine as part of the distributed computing task system context or may be accessed by the application from a remotely accessible source.

Figure 4:
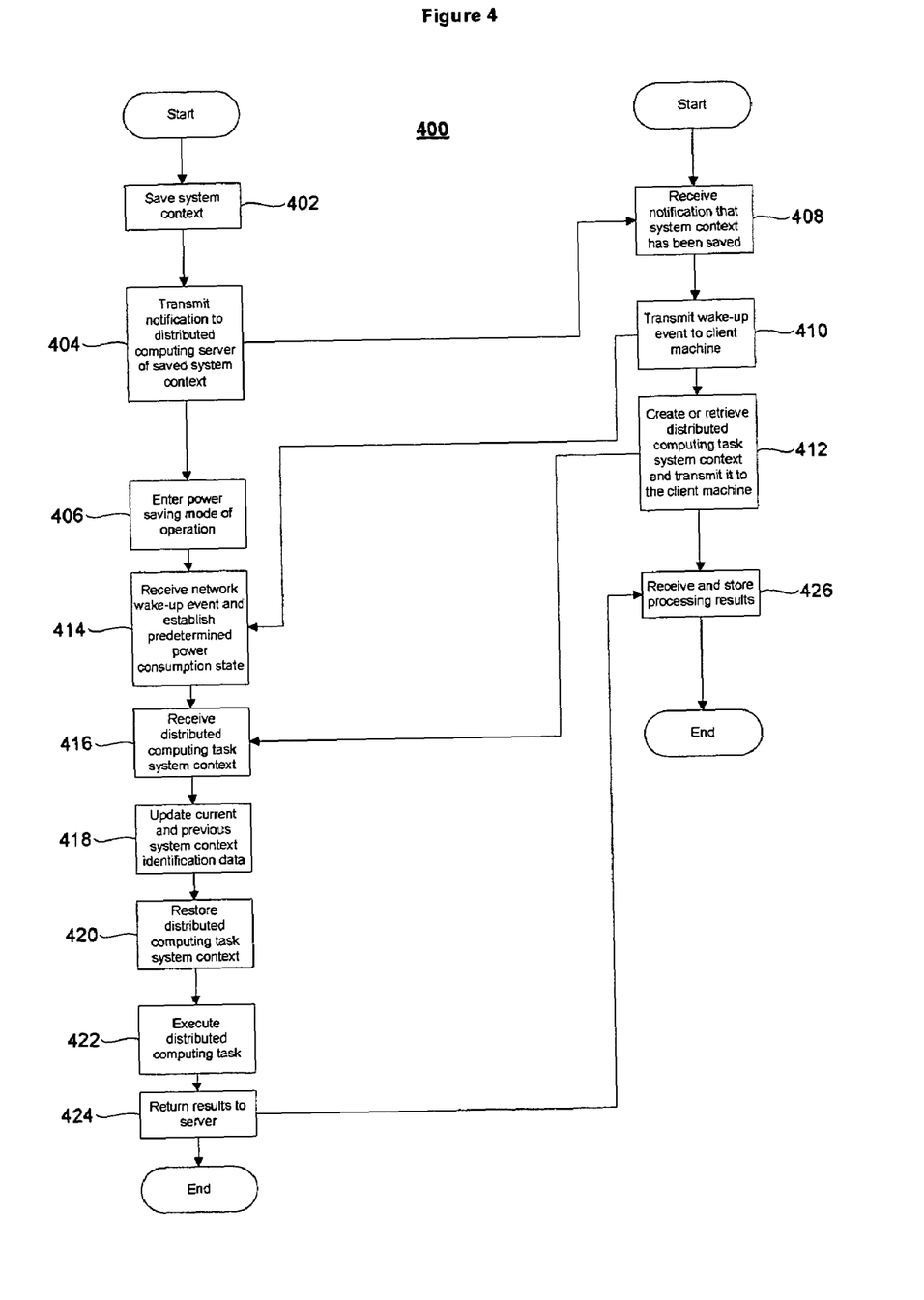
FIG. 4 shows flowcharts of the processing performed by a client machine and a server according to an embodiment.

Referring to FIG. 4, there is shown schematically a pair of flow charts 400 for operating the distributed computing environment 100 according to an embodiment. Within this embodiment, the client machine receives the distributed computing task system context from the distributed computing server 102 after having notified the latter that a power saving state has been or is about to be entered.

At step 402, the OSPM software 214 saves the current system context of the client machine 112 to the non-volatile storage 226. A message is transmitted, at step 404, to the distributed computing server 102 that the client machine has or is about to enter a power saving state. The distributed computing server 102 at step 408 receives that notification. After receiving the notification, the distributed computing server transmits a wake-up message to the client machine at step 410. The server 102 then creates a distributed computing task system context or retrieves such a context from the HDD 124 at step 412 and transmits it to the client machine.

Within the power saving state of operation, it will be appreciated that the power management event detection logic 220 is still responsive to network based wake-up events. Such network wake-up events include notification of the receipt of network messages and a determination of a corresponding curse of action. The wake-up event generated by the message transmitted at step 410 from the distributed computing server 102 to the client machine 112 is received by the latter at step 414.

The transmitted distributed computing task system context is received, at step 416, by the client machine 112. At step 418, the current and previous system context IDs 210' and 210" are updated to indicate that he user system context is now the previous system context 210" and that the recently received distributed computing task system context is the current system context 210'. At step 420, the current system context 210', that is, the distributed computing task system context, is established or restored. The application (not shown) forming part of the distributed computing task is executed at step 422 and the results are returned to the server 102 at step 424. The processing results are received and stored by the distributed computing server 102 at step 426.

It will be appreciated that there will be regular information exchanges between the server and the client as a task progresses. Typically, a distributed computing application contains a number of checkpoints at which the results of processing thus far as stored or output. This is a precautionary measure so that the whole task, in he event of an unexpected failure or abortion of the task, does not have to be performed again. Processing can be backed-out and then resumed from the most recent checkpoint.

Figure 5:
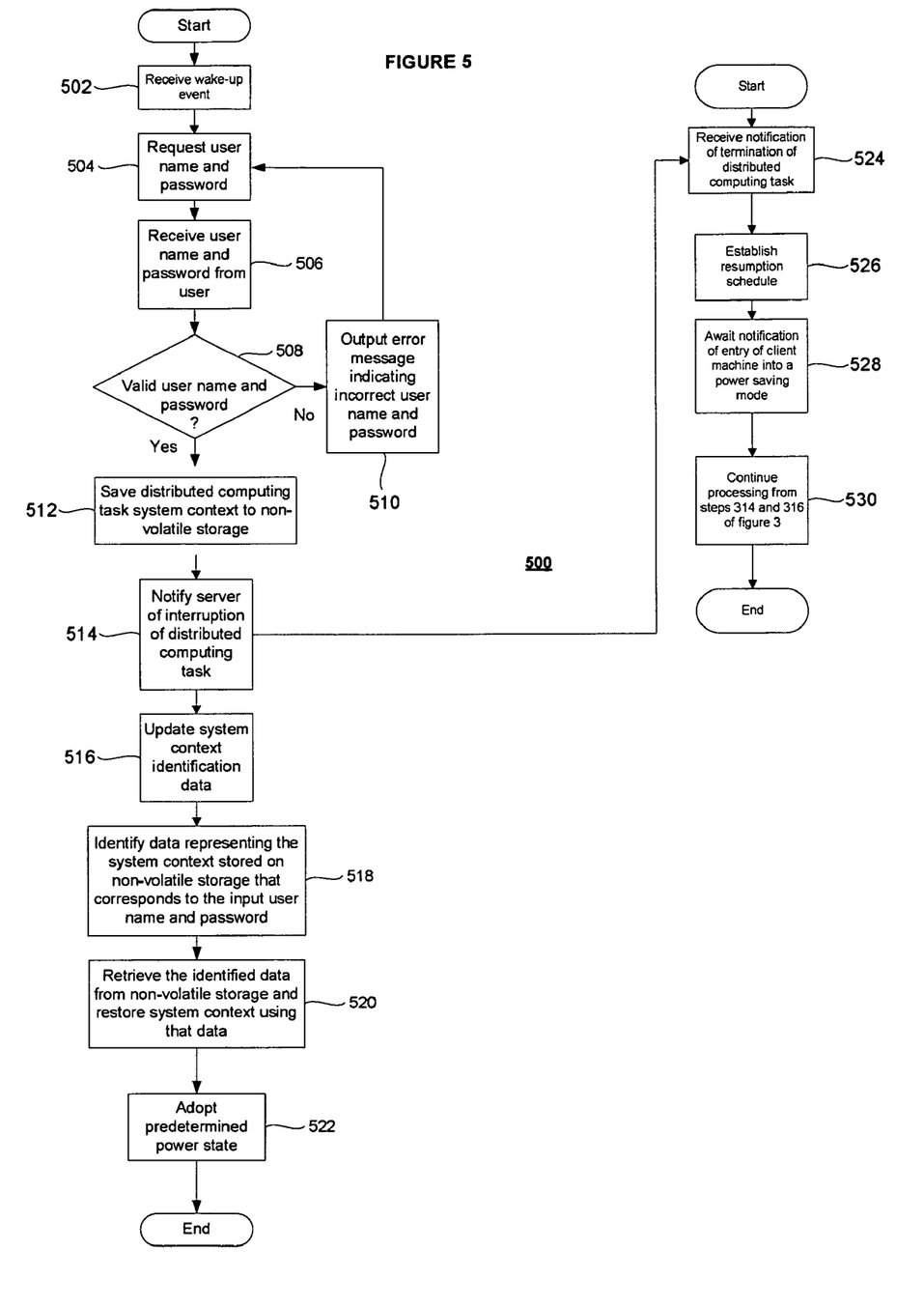
FIG. 5 depicts flowcharts of a wake-up process according to an embodiment.

FIG. 5 shows a pair of flow charts 500 for dealing with the situation where a user returns to their client machine having left it for a sufficient period of time to cause a distributed computing task to be instigated. The user, using the input device 224, causes a wake-up event to be detected by the power management event detection logic 220. The wake-up event is received at step 502. The power management event detection logic 220 informs the wake-up and sleep logic 222 of the event which, in turn, causes the ACPI BIOS 210 to output a log-on screen that requests the user to input their user name and password at step 504. At step 506 the user name and password are received. It is determined, at step 508, whether a valid user name and password have been entered. If either of the user name or password is invalid, an error message is output, at step 510, containing an indication to that effect and control returns to step 504.

However, if a valid user name and password were entered at step 508, the OSPM software 214 at step 512, saves the distributed computing task system context to either a local HDD 226 or to a remotely accessible HDD, such as the HDD 124 of the distributed computing server 102. At step 514, the client machine 112 transmits a notification of the interruption of the distributed computing task to be distributed computing server 102. The system context identification data 210' and 210" are updated at step 516, that is, the current system context ID 210' is set to correspond to the user system context and the previous system context ID 210" is set to correspond to the distributed computing task system context. Using the current system context ID 210', the OSPM software 214 identifies the user context on the HDD 226, at step 518, retrieves the data representing the identified system context from the HDD and restores the system context using that data. At step 522, a pre-determined power state is adopted. Preferably, the pre-determined power state is the working state, that is, state S0.

In response to step 514, the distributed computing server 102 receives the notification of the suspension or termination of the distributed computing task at step 524. The server 102 establishes a resumption routine or schedule; that is, time at which the suspended distributed computing task can be resumed at step 516. The distributed computing server 102, at step 528, awaits notification of the entry into a power saving state of the client machine from which the notice of suspension was received. In response to receiving any such notification of entry into a power saving state, the distributed processing manager 104 causes the OSPM software 214 to restore the previously suspended distributed computing task system context at step 530. In preferred embodiments, step 530, in effect, corresponds to continuing processing at steps 314 and 316 of FIG. 3.

Figure 6:
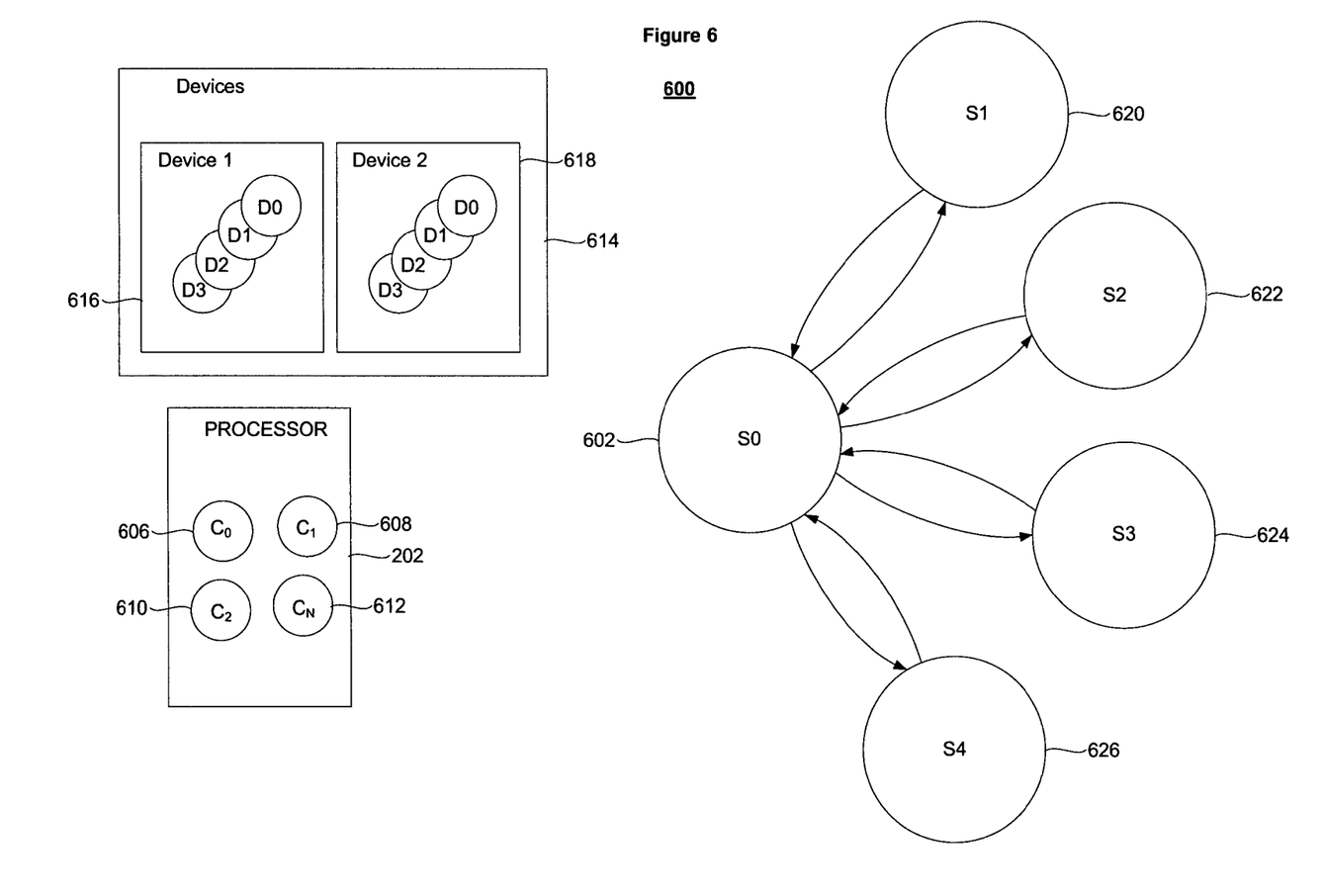
FIG. 6 illustrates schematically ACPI states and state transitions for prior art power management system.

It will be appreciated that the embodiments advantageously the common interface for enabling robust operating system directed motherboard system configuration and power management (OSPM). In particular, the Advanced Configuration and Power Interface (ACPI) specification, in addition to being used for power management, can assist in solving the above prior art problems. The current version of the ACPI is version 2, having a release date of Jul. 27, 2000, together with the ACPI Errata version 1.3, Nov. 27, 2000, both of which are incorporated herein by reference for all purposes. These standards define the following known power management states 600, which are shown in FIG. 6.

State S0: While a system or client machine is in state S0 602, the system is said to be in a working state. The behaviour of that state is define such that a processor 604, or, in a multi-processor system, the processors are, in one of a number of so-called processor states, $C_0$ 606, $C_1$ 608, $C_2$ 610 . . . , $C_N$ 612, which each represent varying degrees of processor operation and associated power consumption. The processor maintains the dynamic RAM context. Any devices 614, such as first 616 and second 618 devices, connected to, or forming part of, the system are individually managed by the operating system software and can be in any one of four possible device states D0-D3, which, again, reflect varying degrees of power consumption. Any associated power resources are arranged to be in a state that is compatible with the device states.

State S1: The S1 state 620 is a low wake-up latency sleeping state. In this state, no system context is lost (CPU or chip set) and the system hardware maintains all system context.

Step S2: The S2 state 622 is also considered to be a low wake-up latency sleeping state. The S2 state 622 is substantially similar to the S1 state 620 but for the CPU and the system cache context being lost in the S2 state, since, typically, the operating system is responsible for maintaining cache and processor context.

State S3: The S3 state 624 is a low wake-up latency sleeping state where all system context is lost except for system memory. The CPU, cache and chip set context are lost in this state. However, the system hardware maintains memory context and restores some CPU and L2 configuration context.

Step S4: The S4 state 626 is the lowest power, longest wake-up latency, sleeping state supported by ACPI. To reduce power consumption, preferably to a minimum, it is assumed that the hardware platform has powered-off all devices. Platform context is maintained.

Figure 7:
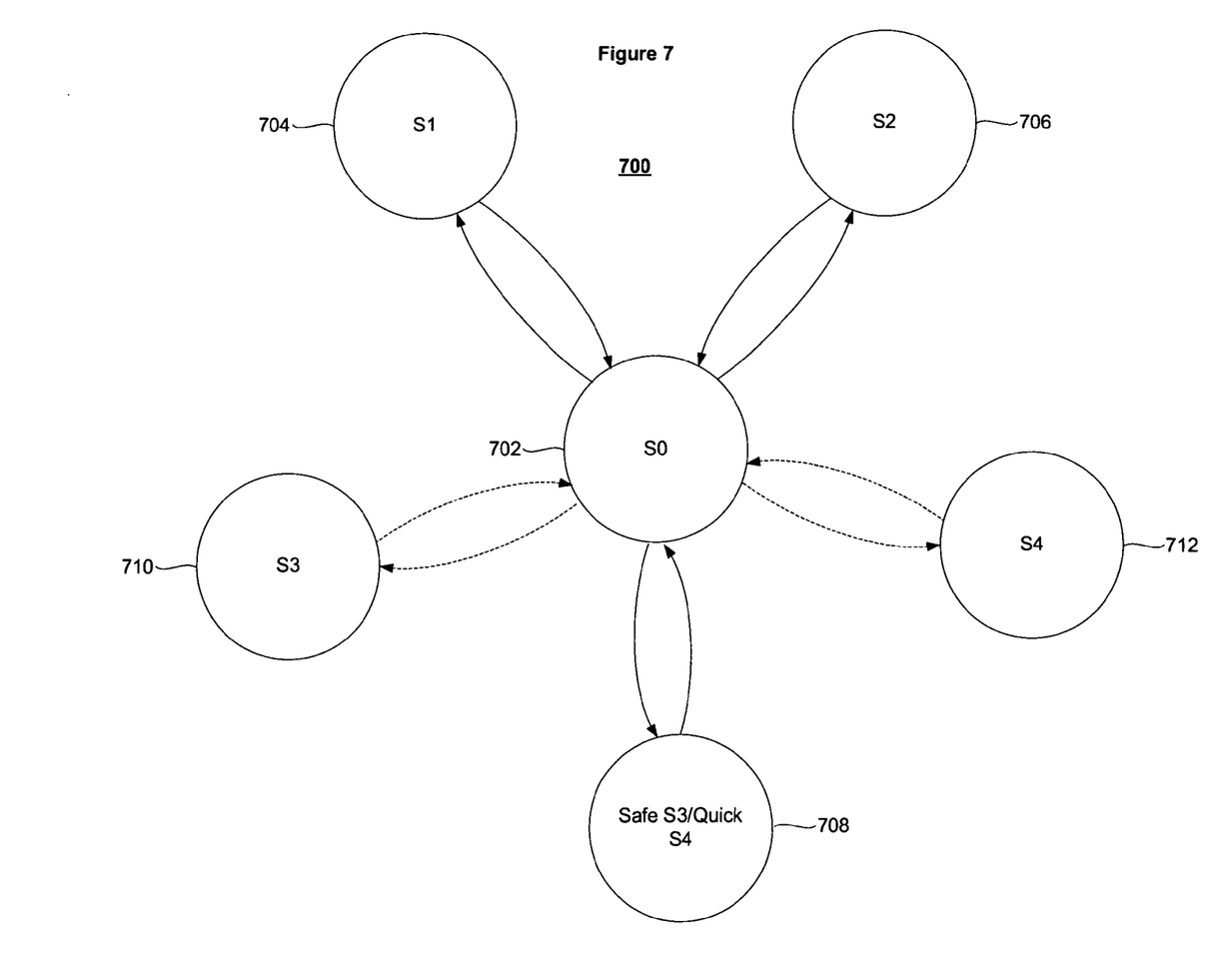
FIG. 7 depicts the power states and transitions according to an embodiment.

FIG. 7 shows a state transition diagram 700 for a power management system according to an embodiment. Again, it can be seen that the state transition diagram 700 comprises at least a working system state S0 702. Preferably, conventional states S1 704 and S2 706 are also supported. The states S0-S2 702 to 706 are substantially identical in operation and realisation to the corresponding states described above in relation to FIG. 6 and in the current ACPI specification.

Additionally, the state diagram 700 illustrates a new state, that is, a Safe S3/Quick S4 state 708 (SS3/QS4). The behaviour of a client machine in the SS3/QS4 can be characterised by the actions of saving substantially the same data to the local or remotely accessible non-volatile storage medium as the conventional S4 state while concurrently maintaining in memory the same data as the conventional S3 state. Furthermore, in the SS3/QS4 state only the RAM 206 remains in a powered state while all other aspects of the client machine adopt substantially the same powered state as the conventional S3 state but for the power management event detection logic 220 to allow a wake-up from that state. The data representing the system context is saved in a file (not shown) that is called "SYS_CONTEXT.SYS".

Therefore, if a power failure occurs while the system is in the SS3/QS4 state 708, the system or client machine context can be restored by loading the SYS_CONTEXT.SYS file from the HDD and restoring the system context. In contrast to the prior art power management state S3, if a power failure occurs, the system context at the time of power failure is recoverable.

In the absence of a power failure, the system context, when waking form the SS3/QS4 state 708, can be restored within a relatively short period of time, such as, for example, 5 seconds, that is, within a time scale comparable to the wake-up time for a conventional S3 state but with the additional security of also being recoverable from a power failure, unlike the conventional S3 state.

Preferably, once the context has been restored following a power failure, the system enters or resumes the SS3/QS4 state 708. However, it will be appreciated that embodiments can be realised in which any one of the states are entered upon recovery, as can be seen from the optional presence of the conventional states S3 710 and S4 712.

Furthermore, even though the above embodiments have been described in terms of having a number of system states, the present invention is not limited to such system states. Embodiments can be realised in which other states such as, for example, Legacy states, mechanical-off states G3 and soft-off S5 states are also supported.

The above embodiments use an HDD as the non-volatile storage. However, it will be appreciated that other forms of non-volatile storage may be used. For example, a locally or remotely accessible flash-memory may be used to store the data to allow recovery from power failure, to allow wake-up from a sleep state or to store the data representing the various distributed computing task system contexts.

Although the above embodiments have been described with reference to user authentication being performed at the BIOS level, embodiments are not restricted to such authentication. Authentication can be performed equally well as the operating system level.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed in one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A distributed computing method for a computer system having a current system context associated with a local user of said computer system and a distributed computing system context, the computer system having a power management system for saving and restoring the current system context and for placing the computer system in at least a first power saving state of a plurality of power management states, and an access controller for providing access to a nonvolatile storage resource for storing and retrieving the current system context and for accessing said distributed computing system context, the method comprising the steps of
- outputting data representing said current system context of the computer system for storage on the non-volatile storage resource prior to being placed in said first power management state, said current system context becoming a saved system context associated with said local user;
- upon receiving a network wake up event, receiving data representing said distributed computing system context for the computer system, said distributed computing system context being different to the saved system context;
- establishing the distributed computing system context within the computer system;
- processing distributed computing task data based on the distributed computing system context, the distributed computing context becoming a current distributed computing context as it changes; and
- switching from the current distributed computing system context back to the saved system context in response to a user request inputted by said local user at said computer system.

2. A method as claimed in claim 1, in which the step of outputting data representing the current system context further comprises the step of entering the first power saving state.

3. A method as claimed in claim 1, in which the step of processing data comprises the step of processing the data using a distributed computing application.

4. A method as claimed in claim 1, further comprising the step of storing the current distributed computing system context on the non-volatile storage resource when switching from the current distributed computing system context back to the saved system context.

5. A method as claimed in claim 4, in which said switching step comprises storing the current distributed computing system context followed by restoring the saved system context, and wherein at least one of the steps of storing and restoring are performed in accordance with a predetermined schedule.

6. A method as claimed in claim 5, in which at least one of the steps of storing and restoring are performed in response to a step of receiving an event.

7. A method as claimed in claim 6, in which the step of receiving an event comprises receiving a notification to switch between the saved and the current distributed computing system contexts.

8. A method as claimed in claim 7, in which the step of receiving the notification comprises receiving data for identifying and providing access to the distributed computing system context.

9. A method as claimed in claim 1, further comprising the step of adopting a power management state other than the first power saving state in response to said user request.

10. A method as claimed in claim 1, further comprising the step of requesting the distributed computing system context from a remote server via a network.

11. A method as claimed in claim 1, in which the step of establishing the distributed computing system context is performed during one of the plurality of power saving states.

12. A method as claimed in claim 1, further comprising the step of outputting a message for transmission to a remote server that the first power saving state has been entered.

13. A system for implementing a method as claimed in claim 1.

14. A computer program product comprising a computer readable storage medium having stored thereon a computer program element for implementing a method as claimed in claim 1.

15. A method as claimed in claim 1 wherein if there exists no previously partially processed distributed process which the computer system needs to complete then the distributed computing system context corresponds to a predetermined distributed computing system context otherwise the distributed computing system context corresponds to a previously saved distributed computing system context which is associated with a partially processed distributed process which the computer system needs to complete.

16. In combination, a distributed computing server coupled to a plurality of individual computers, wherein:
- each individual computer of said plurality of individual computers has at least two context states in which it may operate: a first context state in which the individual computer processes data in response to a local user and a second context state in which the individual computer processes data associated with a distributed computing application in response to the distributed computing server;
- each individual computer of said plurality of individual computers has a first power saving state which is entered when not performing tasks for a local user of the individual computer;
- each individual computer of said plurality of individual computers notifying the server as it enters said first power saving state;
- the server, upon receiving notifications of individual computers entering their respective first power saving states, assigning distributed computing tasks to said individual computers while in their respective first power saving states, the assigning step including causing the individual computers in their respective first power saving states to assume their second context state; and
- each individual computer of said plurality of individual computers being responsive to local user input for leaving said first power saving state, notifying the server about leaving said first power saving state and assuming said first context state.

17. The combination of claim 16 wherein when an individual computer of said plurality of individual computers notifies the server about leaving said first power saving state, the server saves a then current state of the notifying individual computer.

* * * * *